(12) United States Patent
Yu et al.

(10) Patent No.: US 10,659,464 B2
(45) Date of Patent: May 19, 2020

(54) SECURELY AUTHENTICATING A BOT USER

(71) Applicant: Microsoft Technology Licensing, LLC, Redmond, WA (US)

(72) Inventors: Mao Yu, Kirkland, WA (US); Siddharth Uppal, Bothell, WA (US); Yuri Georgiev Dogandjiev, Seattle, WA (US); Adrian Orbita Solis, Bellevue, WA (US); Larry Jin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 15/640,002

(22) Filed: Jun. 30, 2017

(65) Prior Publication Data

US 2018/0332042 A1 Nov. 15, 2018

Related U.S. Application Data

(60) Provisional application No. 62/504,489, filed on May 10, 2017.

(51) Int. Cl.
*H04L 29/06* (2006.01)
*G06F 21/31* (2013.01)
(Continued)

(52) U.S. Cl.
CPC .......... *H04L 63/0884* (2013.01); *G06F 21/31* (2013.01); *H04L 51/02* (2013.01);
(Continued)

(58) Field of Classification Search
CPC . H04L 63/0884; H04L 63/083; H04L 63/102; H04L 63/08; G06F 21/31
(Continued)

(56) References Cited

U.S. PATENT DOCUMENTS 6,607,136 B1 * 8/2003 Atsmon .................. G06F 21/34
235/487
7,536,722 B1 * 5/2009 Saltz ....................... G06F 21/33
726/20
(Continued)

OTHER PUBLICATIONS

"International Search Report and Written Opinion Issued in PCT Application No. PCT/US18/026997", dated Jun. 19, 2018, 13 Pages.
(Continued)

*Primary Examiner* — Saleh Najjar
*Assistant Examiner* — Peiliang Pan
(74) *Attorney, Agent, or Firm* — Schwegman Lundberg & Woessner, P.A.

(57) ABSTRACT

Systems and methods are provided that securely authenticate a user of a web application. For example, the user may utilize a bot from within a first application, such as a chat application. The user may request the bot to access a second application (e.g., a social-networking application) that is remote from the first application. If the bot does not have authorization, the bot may redirect the user to a webpage for the second application, where the user may enter login credentials. Upon verification, the second application may provide an access token to a webpage associated with the bot. To authenticate the bot user, the bot webpage may generate and cache a nonce that is transmitted back to the first application, which then transmits it to the bot. The bot may then compare the received nonce with the cached nonce. If the nonces match, the user may be securely authenticated.

20 Claims, 10 Drawing Sheets

(51) Int. Cl.
*H04L 12/58* (2006.01)
*H04W 12/06* (2009.01)
*H04W 4/21* (2018.01)
*H04L 29/08* (2006.01)

(52) U.S. Cl.
CPC .......... *H04L 63/08* (2013.01); *H04L 63/0807* (2013.01); *H04L 67/02* (2013.01); *H04W 4/21* (2018.02); *H04W 12/06* (2013.01); *H04L 63/083* (2013.01); *H04L 63/102* (2013.01)

(58) Field of Classification Search
USPC .......................................................... 726/5
See application file for complete search history.

(56) References Cited

U.S. PATENT DOCUMENTS

| | | | | |
|---|---|---|---|---|
| 7,895,432 | B2 | 2/2011 | Bjorn | |
| 9,055,050 | B2 | 6/2015 | Gupta | |
| 9,363,676 | B2* | 6/2016 | Guccione | G06F 21/10 |
| 10,484,372 | B1* | 11/2019 | Johansson | H04L 63/0442 |
| 2002/0196935 | A1* | 12/2002 | Wenocur | G06Q 10/107 380/37 |
| 2008/0034211 | A1* | 2/2008 | Shull | H04L 29/12066 713/175 |
| 2008/0083010 | A1* | 4/2008 | Koehler | H04L 63/102 726/1 |
| 2009/0327397 | A1* | 12/2009 | Chen | G06F 16/957 709/202 |
| 2010/0031042 | A1* | 2/2010 | Di Crescenzo | H04L 63/0869 713/169 |
| 2010/0058064 | A1* | 3/2010 | Kirovski | H04L 9/3073 713/176 |
| 2010/0217997 | A1* | 8/2010 | Chai | H04L 9/3271 713/181 |
| 2012/0159184 | A1* | 6/2012 | Johnson | G06F 21/6218 713/189 |
| 2012/0216268 | A1* | 8/2012 | Kassaei | H04L 9/3234 726/9 |
| 2012/0284506 | A1* | 11/2012 | Kravitz | G06Q 40/00 713/151 |
| 2012/0290556 | A1* | 11/2012 | Acosta-Cazaubon | G06Q 30/02 707/711 |
| 2012/0311330 | A1* | 12/2012 | Zhang | H04L 63/0815 713/168 |
| 2013/0104236 | A1* | 4/2013 | Ray | H04L 63/1433 726/25 |
| 2013/0159726 | A1* | 6/2013 | McKeen | G06F 21/72 713/189 |
| 2013/0324046 | A1* | 12/2013 | Xue | H04M 1/7253 455/41.2 |
| 2013/0347116 | A1* | 12/2013 | Flores | H04L 63/1433 726/25 |
| 2014/0082095 | A1* | 3/2014 | Balinsky | G06Q 10/0633 709/206 |
| 2015/0074043 | A1* | 3/2015 | Amir | G06Q 10/06 707/609 |
| 2015/0310196 | A1* | 10/2015 | Turgeman | G06F 21/552 726/19 |
| 2016/0063235 | A1* | 3/2016 | Tussy | G06K 9/00288 726/6 |
| 2016/0248590 | A1* | 8/2016 | Benson | G06F 21/53 |
| 2016/0253481 | A1 | 9/2016 | Tian et al. | |
| 2017/0019423 | A1* | 1/2017 | Kotwal | H04L 63/06 |
| 2017/0048170 | A1 | 2/2017 | Smullen et al. | |
| 2017/0063827 | A1* | 3/2017 | Ricardo | H04L 63/08 |
| 2017/0078886 | A1* | 3/2017 | Raleigh | H04W 12/08 |
| 2017/0250979 | A1* | 8/2017 | Benson | H04L 67/303 |
| 2017/0353405 | A1* | 12/2017 | O'Driscoll | H04L 51/02 |
| 2018/0276053 | A1* | 9/2018 | Kesavan | G06F 9/541 |
| 2018/0278557 | A1* | 9/2018 | Robbins | H04L 51/04 |
| 2019/0213311 | A1* | 7/2019 | Tussy | G06K 9/00255 |
| 2019/0213312 | A1* | 7/2019 | Tussy | G06K 9/00288 |
| 2019/0220863 | A1* | 7/2019 | Novick | G06Q 20/10 |
| 2019/0311102 | A1* | 10/2019 | Tussy | G06K 9/00926 |
| 2020/0042685 | A1* | 2/2020 | Tussy | G06K 9/22 |

OTHER PUBLICATIONS

Matsuzaki, Tsuyoshi, "Build BOT with Authentication (Microsoft Bot Framework)", https://blogs.msdn.microsoft.com/tsmatsuz/2016/09/06/microsoft-bot-framework-bot-with-authentication-and-signin-login/, Published on: Sep. 6, 2016, 6 pages.

Armstrong, Keith, "How Secure Are Chatbots?", https://chatbotsmagazine.com/how-secure-are-chatbots-2a76f115618d, Published on: Jan. 24, 2017, 8 pages.

Gallagher, James, "hawk", https://github.com/James-Gallagher/Facebook-General-Chat-Bot/tree/master/node_modules/hawk, Published on: Mar. 25, 2016, 10 pages.

Walchuk, Zach, "Easy Slack integration for Watson Conversation", https://www.ibm.com/blogs/watson/2016/10/easy-slack-integration-watson-conversation/, Published on: Oct. 28, 2016, 10 pages.

"Setting Up Authentication for Action Tasks", https://support.kore.com/hc/en-us/articles/205452938-Setting-Up-Authentication-for-Action-Tasks, Published on: Feb. 18, 2016, 9 pages.

"Using OAuth 2.0", https://api.slack.com/docs/oauth, Retrieved on: May 8, 2017, 9 pages.

* cited by examiner

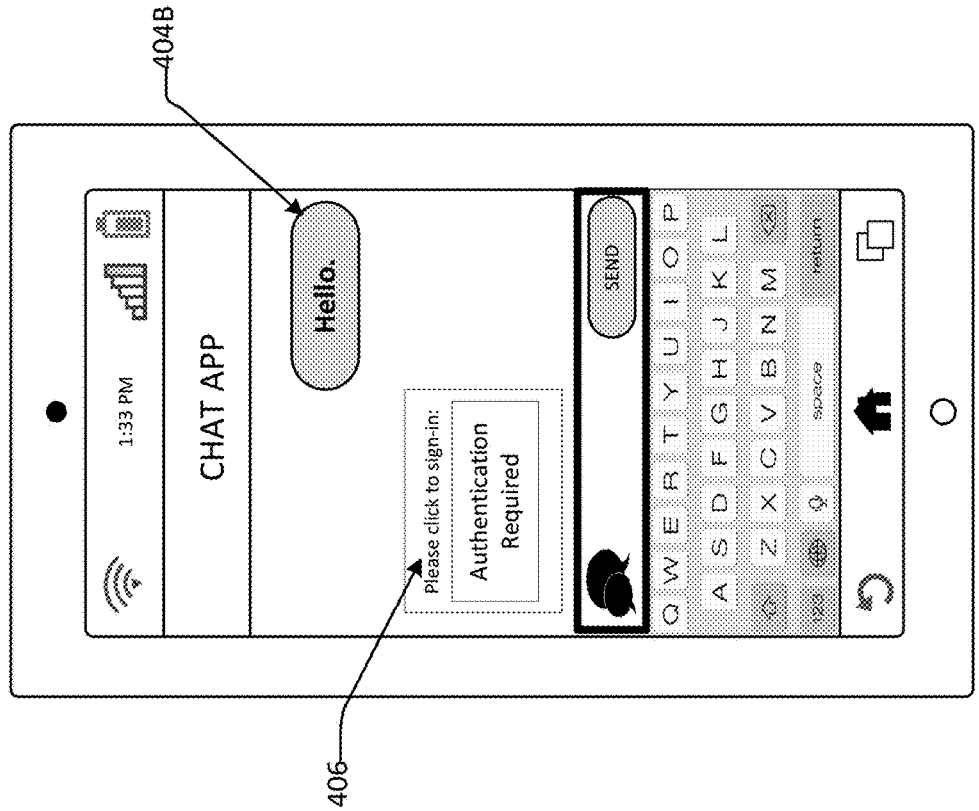
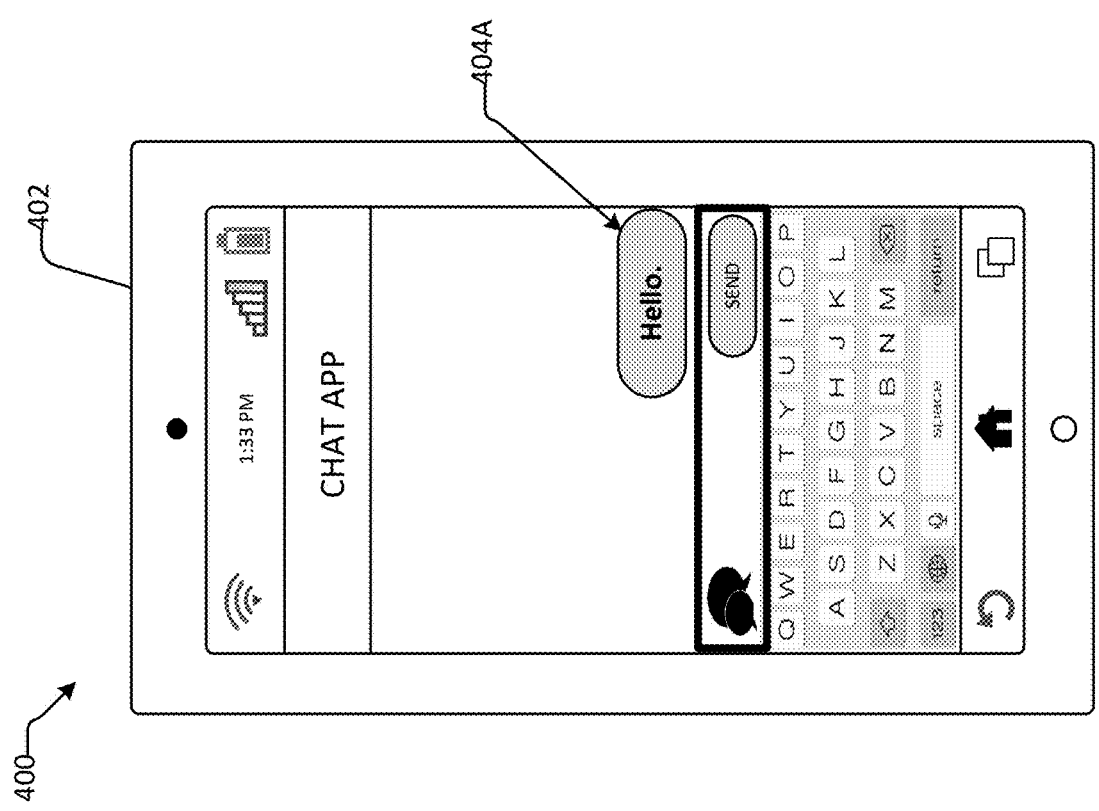
FIG. 4B
FIG. 4A

SECURELY AUTHENTICATING A BOT USER

RELATED APPLICATIONS

This application claims the benefit of U.S. Provisional Application Ser. No. 62/504,489, entitled "SECURELY AUTHENTICATING A BOT USER VIA EMBEDDED WEB APP," filed on May 10, 2017, the entire disclosure of which is hereby incorporated herein by reference.

BACKGROUND

Most login experiences are performed via a secure website, which Identity Providers (IdPs) control rigidly. Because bots are conversational experiences within chat apps, it is typically clunky and awkward for the bots themselves to authenticate a user. Thus, in order to maintain positive user experiences within a chat application, the authentication process should be more streamlined and elegant, while maintaining a secure connection.

When signing into a web application (e.g., Facebook®, Google®), a user is taken through the OAuth 2.0 flow, which is used to perform authentication and authorization in most application types. It works by delegating user authentication to the service that hosts the user account and authorizing third-party applications to access the user account. This typically works well for web browsers, but is cumbersome for bots. OAuth 2.0 was initially built for redirection on the client side, not the server side. Thus, authenticating a bot user requires the user to copy a large string of numbers and characters (i.e., an identification number) that will bridge the bot channel and a third-party server. The current bot authentication protocol is clunky because users are required to copy and paste this large identification number, which significantly decreases the user experience and increases network traffic.

It is with respect to these and other general considerations that example aspects, systems, and methods have been described. Also, although relatively specific problems have been discussed, it should be understood that the examples should not be limited to solving the specific problems identified in the background.

SUMMARY

Most login experiences that use a bot to authenticate a user's credentials are clunky and inelegant. For example, suppose a user is communicating with a chat bot, and that bot must access the user's resources in a third-party service, e.g., the user's Instagram® data. In order for the bot to access that data, the user must authenticate with Instagram® and pass those credentials to the bot in a secure manner. However, this action crosses the trust boundary between the web browser hosting the Instagram® login and the messaging application hosting the bot. In traditional web and mobile applications, this is achieved via the OAuth 2.0 flow, which delegates access of user data to the application itself. However, with bots, this experience is subpar and not entirely secure.

In light of this subpar experience and lack of security, an improved version of the authentication flow is disclosed herein. For example, suppose the user is interacting with a first application (e.g., a messaging application or a chat application). In aspects, a web application may be accessed from the first application. The web application may be any third-party web application (e.g., a third-party chat bot) accessed within the first application. In aspects, the user may request the web application to access a second application that is remote from the first application (e.g., a third-party social-networking application such as Instagram®, Snap Chat®, Google®, Facebook®, etc.). The bot may then check if the user is authenticated for access to the second application. If the user has not yet been authenticated, then the bot may provide a login URL to the user. The login URL may open a browser window for inputting user credentials for the second application. Upon verifying the user credentials, the second application may then pass an access token back to a web service associated with the web application (e.g., a website owned by the bot developer).

However, at this point, the web service is unable to verify that the user who entered the user credentials for the second application is the same user accessing the web application (e.g., bot) within the first application. In this case, the web service may generate a nonce, which is a unique, arbitrary value. The web service may then call the first application's software development kit (SDK) to pass the nonce to the first application (e.g., a messaging application). In aspects, the web service also stores the nonce in a cache. After the first application receives the nonce, the first application may then re-transmit a secure message (which is invisible to the user) back to the web application, which message may include a user ID for the first application. The web application (e.g., bot) may then receive the nonce and check its cache (which includes a collection of stored nonces compiled by the web service) to ensure that a stored nonce matches the received nonce in the message. In aspects, the web application may match the received nonce with a stored nonce indexed to the user ID or simply based on matching the received nonce with a stored nonce from the collection of stored nonces (which, by definition, are each unique).

By implementing the authentication flow in this manner, a nonce is transmitted from the web service back to the first application (e.g., messaging application), which nonce is then securely and invisibly sent from the first application to the web application for verification. In this way, the user is authenticated without having to perform any additional action, resulting in a superior user experience and incurring no additional work on part of the developer.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTIONS OF THE DRAWINGS

FIG. 4A illustrates an example interface associated with a chat bot within a chat application.

FIG. 4B illustrates an example interface associated with a chat bot within a chat application displaying an authentication prompt.

DETAILED DESCRIPTIONS

Figure 1:
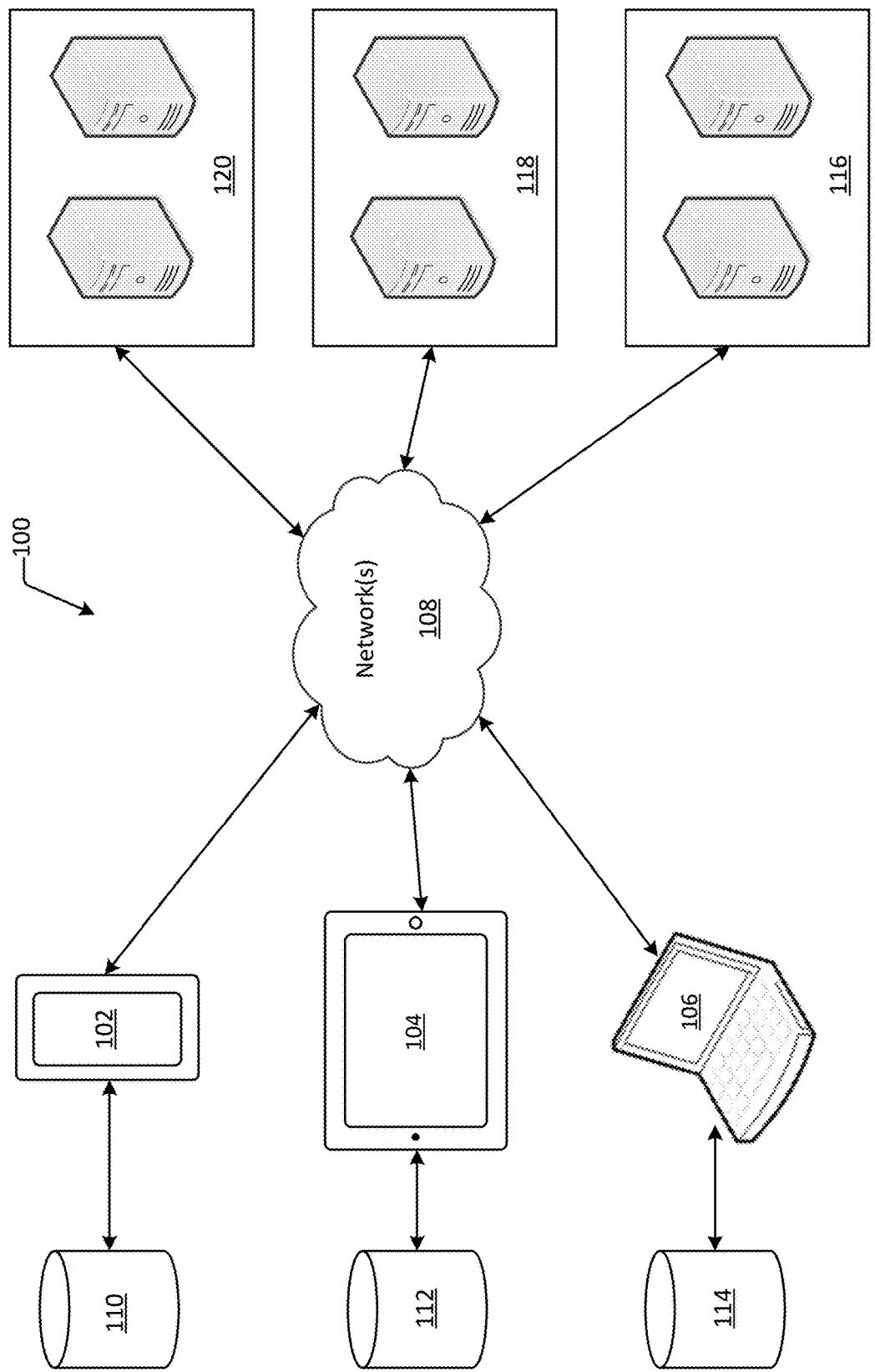
FIG. 1 illustrates an example of a distributed system for securely authenticating a user via a web application.

In the following detailed description, reference is made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or devices. Accordingly, example aspects may take the form of a hardware implementation, a software implementation, or an implementation combining software and hardware aspects. The following detailed description is therefore not to be taken in a limiting sense, and the scope of the present disclosure is defined by the appended claims and their equivalents.

Users are often burdened with clunky login experiences when attempting to interact with a bot inside a web application. For instance, as detailed above, a user may send a message to a bot within a messaging application. In some cases, the user may request the bot to access information associated with an account for a third-party application (e.g., the user's Instagram® account). The bot checks whether the user's identification from the messaging application (e.g., the user ID) is authenticated with the third-party application (e.g., Instagram®). If the user ID is not authenticated, the bot may transmit a login URL to the user. The user may then click on the login URL, which may result in opening a browser window associated with the third-party application. The user may then log into the user's account associated with the third-party application (e.g., the user's Instagram® account). Upon verifying the user's credentials, the third-party application may pass an access token to a web service associated with the bot (e.g., a website owned by the third-party bot developer). However, while the web service may receive the access token from the third-party application, current solutions cannot securely guarantee the identity of the user that opened the web browser to login into Instagram® is the same user utilizing the bot within the messaging application. As a result, the user traditionally experiences a non-intuitive and awkward authentication process with the bot.

The present disclosure describes a solution in which the user is not required to manually authenticate him- or herself to the web application (or to a web service associated with the web application). Instead, as described above, a nonce may automatically be generated and stored by the bot web service, which may then transmit the nonce to the messaging application. The messaging application may then invisibly transmit the nonce to the web application (e.g., bot). The bot verifies the received nonce by determining whether the received nonce matches a stored nonce within its cache (e.g., as stored by the bot web service). If the received nonce matches a stored nonce, then the user is authenticated and the user is allowed to access the third-party application (e.g., Instagram®). In some cases, an access token may be associated with the user ID for future access to the third-party application via the web application.

Not only do developers and users incur no additional work to authenticate the user to the web application, but the user experience is also significantly improved. Furthermore, the solution disclosed herein may be implemented across multiple devices on a variety of operating environments, further improving the user experience. For example, if a user is securely authenticated with a bot inside a messaging application on a laptop computer, the user may establish a subsequent secure connection with the bot inside the same messaging application running on a mobile device.

FIG. 1 illustrates an example of a distributed system 100 for securely authenticating a bot user via a web application.

A system 100 that securely authenticates user credentials for a third-party application (e.g., a social-networking application such as Instagram®, Facebook®, Snapchat®, etc.) to a chat bot within a messaging application (e.g., chat application) is provided. Such a system may be run on an electronic device including, but not limited to, client devices such as a mobile phone 102, a tablet 104, and a personal computer 106. The disclosed system may receive device login credentials associated with third-party applications. The system may share those login credentials across multiple devices to ensure that the login process is seamless for the user.

In an example, a user may utilize a chat bot hosted within a messaging application (e.g., a chat application or "Chat-App"). The user may access the messaging application via any device associated with the user, e.g., client devices 102, 104, 106, which may execute the messaging application locally and/or may access the messaging application (e.g., via a browser) executing remotely (e.g., on servers 116). In aspects, the third-party chat bot (hereinafter "bot") may be associated with a web service executing on one or more other servers, e.g., servers 118. In further aspects, the bot may authenticate the user based on identification information passed from the messaging application to the bot (e.g., the user's messaging ID). In some cases, the user may request the bot to access third-party applications associated with the user (e.g., user accounts for Instagram®, Facebook®, Snapchat®, etc.). In aspects, these third-party applications may be hosted by one or more other servers, e.g., servers 120. However, if the user ID has not been authenticated with such third-party applications, the bot will be unable to gain access. It is with respect to this situation that the present solution is directed.

In this case, the bot within the messing application may provide the user with a login URL associated with the requested third-party application. Upon activating the login URL, a window associated with the third-party application may open within the messaging application, enabling the user to log into the third-party application (e.g., on servers 120 via network 108). The third-party application may then verify the user's credentials and forward an access token (or other authentication) to a website associated with the bot (e.g., hosted on servers 118). However, in this case, the bot is unable to verify that the user who accessed the login URL is the same user accessing the bot via the messaging application. To address this situation, the bot website generates and transmits a nonce to the messaging application, which then retransmits the nonce to the bot via an invisible message. The bot can then verify the received nonce by comparing it to an index of stored nonces saved in a cache by the bot website. If the received nonce matches a stored nonce, then the user is authenticated and the bot may associate the user ID with the access token (or other authentication) for the third-party application. In aspects, once a user ID has been authenticated with the third-party application, a bot within the messaging application (running on the same device or another device of the user) may subsequently access the third-party application.

The access token and nonces associated with the system disclosed herein may be stored locally and/or remotely. An electronic device may utilize local data stored in local databases 110, 112 or 114, remote databases stored on servers 116, 118, and 120, or a combination of both. For example, mobile phone 102 may utilize local database 110 and access servers 116, 118, and/or 120 via network(s) 108 to securely authenticate a bot user via a web application. In other example aspects, tablet 104 may utilize local database 112 and network(s) 108 to securely authenticate a bot user, as well as store and transmit any associated access tokens or nonce values.

As should be appreciated, the various methods, devices, components, etc., described with respect to FIG. 1 are not intended to limit systems 100 to being performed by the particular components described. Accordingly, additional topology configurations may be used to practice the methods and systems herein and/or components described may be excluded without departing from the methods and systems disclosed herein.

Figure 2:
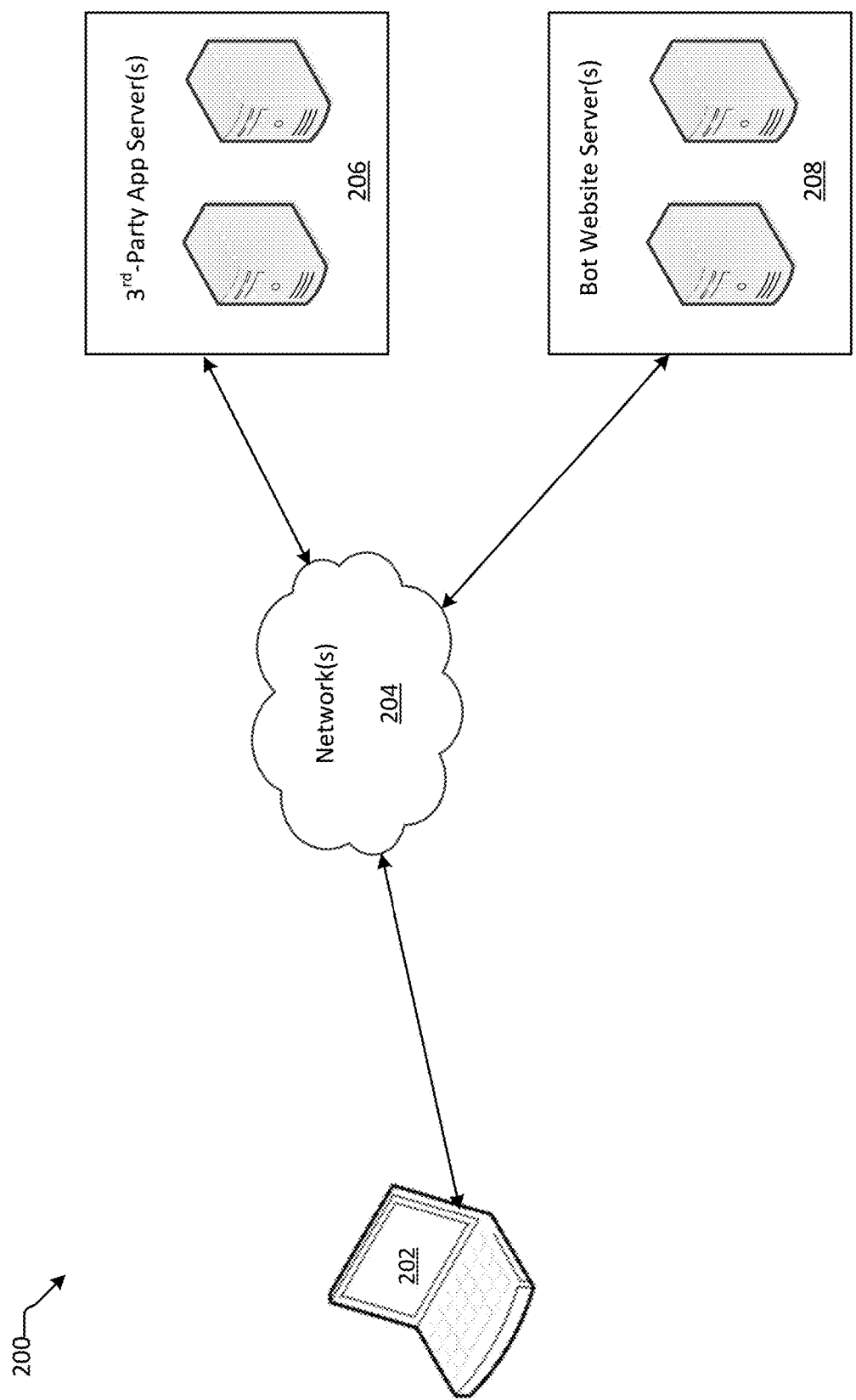
FIG. 2 illustrates a communication system for securely authenticating a user via a web application.

FIG. 2 illustrates a communication system 200 for securely authenticating a bot user via a web application.

System 200 may begin with an initial connection process. The initial connection process may involve an electronic device, such as electronic device 202. The electronic device 202 may be used to run an application, such as a messaging application (e.g., a chat application such as WhatsApp®, Facebook® Messenger, WeChat®, Slack®, etc.). A bot may be accessed within such messaging application. A user may request the bot to access a third-party application associated with the user. The bot may then check if the user identification from the messaging application (e.g., user ID) is authenticated with the requested third-party application (e.g., Instagram®). If so, the bot may proceed to access the third-party application as requested. If not, the bot (via the messaging application) may prompt the user to enter login credentials by redirecting the user to a login URL of the third-party application (e.g., on servers 206). Once the user clicks on the URL provided by the bot, a window within the messaging application may enable the user to enter the login credentials associated with the third-party account. The window within the messaging application may be displayed on electronic device 202, and the webpage associated with the third-party account may be provided by servers 206 to the electronic device 202 over network 204. The login credentials may be compared with stored login credentials for the third-party account on servers 206, which subsequently communicate an access token to a webpage associated with the bot, e.g., on servers 208.

However, at this point, the bot within the messaging application is unable to verify that the user who accessed the login URL is the same user who is communicating with the bot within the messaging application. Accordingly, the bot webpage (on servers 208) may generate a nonce, which is unique arbitrary number, may store the nonce in a cache accessible by the bot, and may pass the nonce to a software development kit (SDK) associated with the messaging application. That is, the bot webpage running on servers 208 may pass the nonce to the messaging application accessed on the electronic device 202 (e.g., the messaging application running either locally or remotely via a browser over network(s) 204). The messaging application may receive the nonce and then retransmit it via a silent message to the bot within the messaging application. In aspects, a "silent" or "invisible" message is a message that is not visible to the user and/or not manually implemented by the user. The bot may then check its cache for a stored nonce matching the received nonce. If the stored nonce from the bot cache and the received nonce from the message match, then the bot may be securely authenticated to access the third-party application using the access token passed from the third-party login URL (e.g., on servers 206) to the bot website (e.g., on servers 208). The bot and/or the messaging application may further associate the access token for the third-party application with the user ID for the messaging application.

In some example aspects, the bot webpage servers 208 may communicate with electronic device 202 via network(s) 204. Information may also be transmitted from the third-party application servers 206 to the bot webpage servers 208 via network(s) 204. Network(s) 204 may include any combination of one or more local-area networks (e.g., LAN) and/or wide-area network(s) (e.g., WAN), private networks (e.g., intranet) and/or public networks (e.g., the Internet), for communicating information between electronic device 202, servers 206, and/or servers 208.

As should be appreciated, the various methods, devices, components, etc., described with respect to FIG. 2 are not intended to limit systems 200 to being performed by the particular components described. Accordingly, additional topology configurations may be used to practice the methods and systems herein and/or components described may be excluded without departing from the methods and systems disclosed herein.

Figure 3:
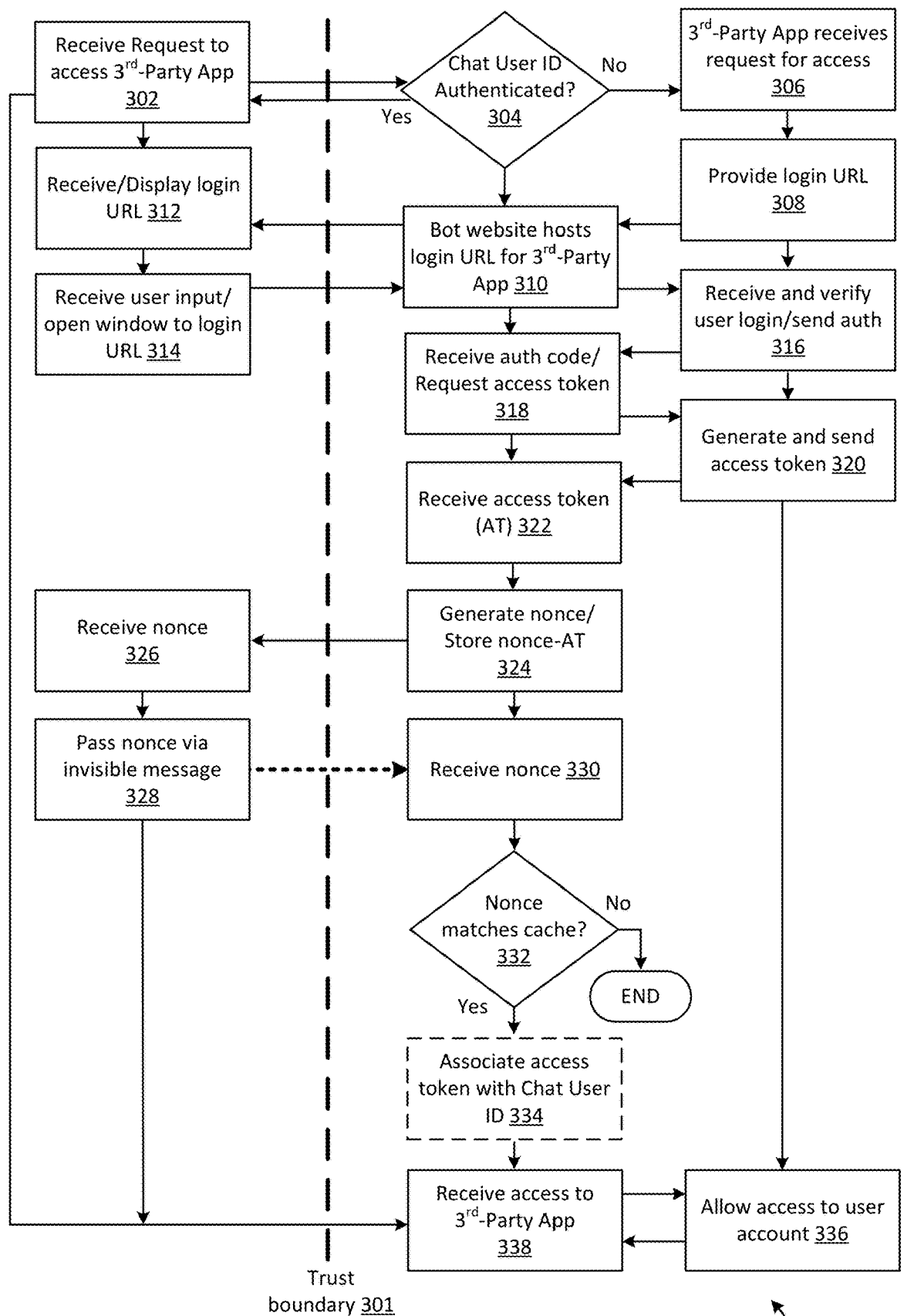
FIG. 3 is a block diagram illustrating a method for securely authenticating a user via a web application.

FIG. 3 is a block diagram illustrating a method 300 for securely authenticating a bot user via a web application.

As depicted, system 300 begins with a receive request operation 302. In aspects, a user may be communicating with a chat bot within a messaging application (e.g., a Chat App). In some cases, in order for the user to access the bot, the messaging application may pass user identification information (e.g., a user ID) to a website hosting the bot. For instance, the bot website (e.g., executing on one or more servers) may provide chat bots as a service to various messaging applications. In further aspects, the bot may be hosted within the messaging application, but may be executed on and/or in direct communication with the bot website. As should be appreciated, while the present methods are described with reference to a "chat bot" accessed within a messaging application, any web application within another application may similarly authenticate a user according to the methods described herein.

At receive user request operation 302, the bot via the messaging application may receive a request to access user information from a third-party application, such as Instagram®, Snap Chat®, Facebook®, etc.

At determine authentication operation 304, the bot may determine whether the user identifier (e.g., user ID) for the messaging application is authenticated for access to the user's account for the third-party application (e.g., Instagram®). If the user ID has already been authenticated, the bot may respond "Yes" from authentication operation 304 back to the messaging application at receive request operation 302 and to receive access operation 338 for access to the third-party application, which access is allowed by the third-party application at allow access operation 336. In some example aspects, when the user ID has been authenticated for access to the user's account on the third-party application, the bot (or the messaging application) may provide a notification to the user that the third-party account has already been authenticated.

However, when the user ID for the messaging application has not yet been authenticated for access to the third-party application, the method may proceed to receive access request operation 306. At request access operation 306, the third-party application may receive a request for access from the bot. In response to the request for access, at provide login operation 308, the third-party application may provide the bot website with a login URL associated with the third-party application (e.g., an Instagram® Login URL). At host login operation 310, the bot website may host the login URL and provide the login URL to the messaging application. At receive/display operation 312, the messaging application may receive the login URL and display the login URL to the user. At receive input/open window operation 314, the messaging application may receive user input (e.g., via a click, touch, swipe, hover, etc., on the login URL) and may open a window within the messaging application to navigate via the bot website (at host operation 310) to a webpage associated with the login URL for the third-party application. In aspects, when the user navigates to the login URL, a trust boundary 301 may be crossed between the messaging application and the third-party application.

At receive/verify user login operation 316, when the user accesses the login URL and enters user credentials, the third-party application may receive and verify the user credentials for the user's account. For instance, the third-party application may compare the user credentials to a store of user credentials maintained by one or more servers executing the third-party application.

If the user credentials are verified, the third-party application may generate an authorization code and may pass (or send) the access token to the bot website at receive/verify user login operation 316. In aspects, the authorization code may have a short expiration time (e.g., 10 minutes). In this case, at receive authorization/request access token operation 318, the bot website may receive the authorization code from the third-party application and request an access token, which may have a longer lifetime. Based on the authorization code and/or any other suitable determination, at generate/send operation 320, the third-party application may generate and send an access token (AT) to the bot website. At receive operation 322, the bot website may receive the access token.

In some cases, as detailed above, in order to access the bot within the messaging application, the messaging application may pass the user ID to the bot website. In this case, the user ID may authenticate the user requesting access to the bot to the bot website. Additionally, whereas the bot may be a web application hosted by or accessed within the messaging application, the bot may be executed on and/or in direct communication with the bot website.

As detailed above, the bot website may be unable to verify that the user accessing the bot within the messaging application is the same user who entered user credentials into the login URL for the third-party application. Thus, at receive operation 322, while the bot website may receive an access token for the user's account associated with the third-party application, the bot website may be unable to authenticate the user. In this case, at generate nonce operation 324, the bot website may generates a nonce. A nonce is a unique arbitrary number that may only be used once. Additionally, at generate nonce operation 324, the bot website may associate the access token (AT) received from the third-party application with the nonce and may store the nonce-AT in a cache. In aspects, the nonce may be indexed in the cache based on the user ID, or may simply be stored with the access token. In further aspects, the cache may include a collection of stored nonces.

At receive nonce operation 326, the messaging application may receive the nonce from the bot website. In some aspects, the bot web site may pass the nonce to the messaging application along with the user ID.

At pass operation 328, the messaging application may pass the nonce back to the bot via an invisible message (not shown). That is, upon receiving the nonce from the bot website, the messaging application may identify the user (e.g., based on the user ID) and pass the nonce via an invisible message to the bot communicating with the user within the messaging application. As detailed above, an "invisible" message may be a message that is not visible to the user and/or not manually implemented by the user.

At receive operation 330, the bot may receive the nonce from the messaging application and the bot may access the cache of nonces stored by the bot website at generate nonce operation 324 to perform determination operation 332. As should be appreciated, while the bot is accessed from within the messaging application, the bot may be executing on and/or in direct communication with the bot website.

At determination operation 332, the bot may determine whether the nonce received from the messaging application (e.g., the received nonce) matches a stored nonce within the cache. If the received nonce does not match a stored nonce, the user cannot be authenticated and the method ends. In this case, the bot may not access the user's account on the third-party application (e.g., Instagram®) and the bot may provide a notification to the user that the request to access the third-party application cannot be completed. Alternatively, if the received nonce matches a stored nonce in the cache, the method may progress to optional associate operation 334.

At optional associate operation 334, the bot (or the messaging application) may associate the access token for the third-party application with the user ID for the messaging application. In this case, for subsequent requests to access the user's account for the third-party application, the bot may determine that the user ID has been authenticated for the third-party application and the bot may proceed directly to allow access operation 338.

At allow access operation 336, the third-party application may allow the bot to access the user's account on the third-party application. In some cases, before allowing access at allow access operation 336, the third-party application may receive and verify the access token from the bot (or the messaging application). In aspects, the access token may be passed within the user ID to the third-party application, within a message from the bot (or the messaging application) to the third-party application, or otherwise.

At receive access operation 338, the bot within the messaging application may receive access to information in the user account for the third-party application (e.g., photos posted to Instagram®). In some aspects, once the bot is authenticated with the third-party application, the bot may subsequently access the user account without repeated authentication (e.g., based on the user ID associated with the access token). In further aspects, the access token may be associated with an expiration date. After such expiration date, the bot (or the messaging application) may be required to re-authenticate with the third-party application.

By utilizing these steps, the third-party application servers, the bot website servers, and the electronic devices associated with the system disclosed herein may all communicate silently (or invisibly) to the user. Furthermore, the user and/or the developer may not incur an additional burden. For instance, successful authentication of the user may occur without the user being required to manually copy and paste a magic number and/or without the developer being required to verify a signature.

As should be appreciated, the various methods, devices, components, etc., described with respect to FIG. 3 are not intended to limit system 300 to being performed by the particular components described. Accordingly, additional topology configurations may be used to practice the methods and systems herein and/or components described may be excluded without departing from the methods and systems disclosed herein.

FIG. 4A illustrates an example interface associated with a chat bot within a chat application.

In order to initiate the system of securely authenticating a user of a bot accessed within a messaging application, the user may first open a message application (e.g., "Chat App") on an electronic device, such as mobile device 402. In some aspects, the Chat App may include a chat bot for communicating with the user. For instance, to communicate with the chat bot, the user may enter a message 404A into an interface associated with the Chat App. In some cases, the user may request the chat bot to access information in the user's account associated with a third-party application (not shown). For instance, the user may request the chat bot to access photos that the user posted within the user's Instagram® account (not shown).

In response to receiving the request to access the third-party application, the chat bot may determine whether the user ID associated with the Chat App is authenticated to access the user account associated with the third-party application. If the user ID is authenticated, the chat bot may proceed to access the photos requested by the user within the user's Instagram® account. Alternatively, as illustrated by FIG. 4B, if the user ID has not been authenticated for the third-party application, the chat bot may provide a prompt to the user (from within the Chat App) that authentication is required.

FIG. 4B illustrates an example interface associated with a chat bot within a chat application displaying an authentication prompt.

In the event that the user ID has not been previously authenticated to access the requested third-party application, the chat bot within Chat App may prompt the user to log into the third-party application through an authentication prompt 406. The user may select the authentication prompt 406, which may open a window in the Chat App with a login URL for redirecting the user to the login page of the third-party application (e.g., Instagram®). As described previously, a user may log into the third-party application via the login URL and, upon verification of the user's login credentials, the third-party application may transmit an authentication code (and, thereafter, an access token) to a webpage associated with the chat bot.

However, at this point, the bot website is unable to verify that the user who entered the login credentials into the login URL is the same user accessing the chat bot within the Chat App. Accordingly, to authenticate the user, the bot website generates and caches a nonce, which is a unique arbitrary value. The nonce is then passed to the messaging application (Chat App), which then passes the nonce to the chat bot via a message that is invisible to the user. The chat bot may then verify that the received nonce matches the cached nonce that was created and cached by the bot website. If the received nonce and the cached nonce match, the user is authenticated and the chat bot can use the access token received from the third-party application (e.g., Instagram®) to access the photos requested by the user within the user's Instagram® account.

As should be appreciated, the various methods, devices, components, etc., described with respect to FIGS. 4A and 4B are not intended to limit systems 400 to being performed by the particular components described. Accordingly, additional topology configurations may be used to practice the methods and systems herein and/or components described may be excluded without departing from the methods and systems disclosed herein.

Figure 5:
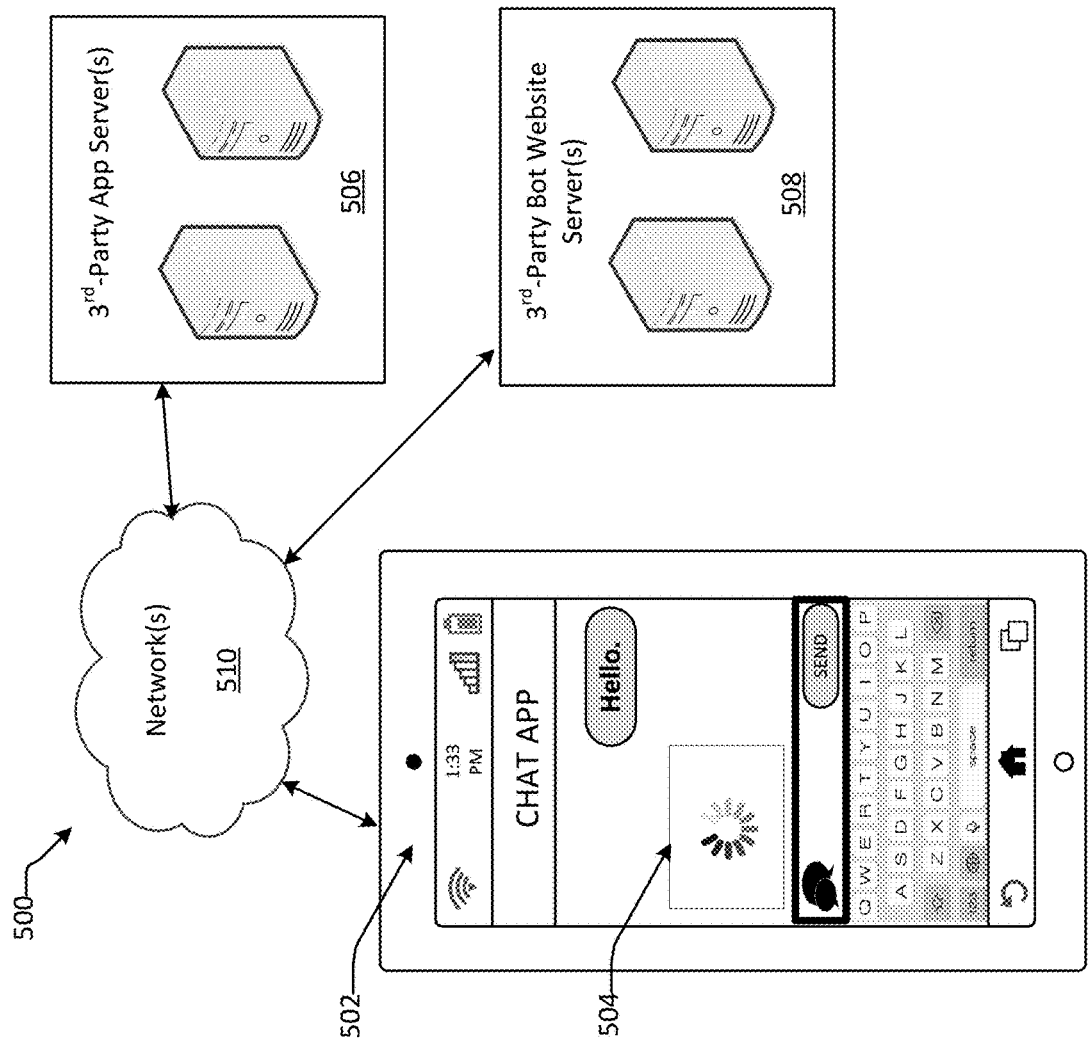
FIG. 5 illustrates an example of how a chat application may communicate with third-party application server(s) and third-party bot website server(s).

FIG. 5 illustrates an example of how a chat application may communicate with third-party application server(s) and bot website server(s).

In one example aspect, a user on an electronic device, such as mobile device 502, may be prompted by the chat bot within a window of a chat application to enter login credentials for a third-party application. The user may select the authentication prompt 406 (see FIG. 4B) and be redirected to a login page of the third-party application. For instance, when the user selects the authentication prompt 406, the prompt may change to a processing wheel 504. Upon clicking the login URL (which may be provided in a window within or overlaying the interface associated with device 502, not shown), the user may then enter login credentials into a webpage that is executing on and/or communicating via network(s) 510 with the third-party application server(s) 506. The login credentials may be verified by the third-party application server(s) 506, and an authorization code (and, thereafter, an access token) may be created and passed to the bot website server(s) 508 via network(s) 510. Network(s) 510 may include any combination of one or more local-area networks (e.g., LAN) and/or wide-area network(s) (e.g., WAN), private networks (e.g., intranet) and/or public networks (e.g., the Internet), for communicating information between mobile device 502, servers 506, and/or servers 508.

However, as detailed above, the third-party bot website server(s) 508 may be unable to verify that the user who entered credentials into the webpage associated with the third-party application is the same user accessing the chat bot within the chat application. At this point, the bot website server(s) 508 may receive the access token and create a nonce. The nonce may be cached with the access token and the nonce may then be passed back to the chat application (e.g., Chat App) that is running on mobile device 502. The chat application may then pass the nonce to the chat bot within the chat application via an invisible message. The chat bot may then compare the received nonce with the cached nonce. If the received nonce and the cached nonce match, the chat bot (or the Chat App) may then associate the user ID for the Chat App with the access token received from the third-party application server(s) 506.

The communication among the chat application, the chat bot, the third-party application and its servers, and the third-party bot website and its servers may occur in the background (i.e., invisible to the user). In this way, the user is not required to enter a "magic number" received from the third-party bot website, or otherwise manually authenticate him- or herself. Thus, the nonce generation and verification is automatic and secure.

As should be appreciated, the various methods, devices, components, etc., described with respect to FIG. 5 are not intended to limit systems 500 to being performed by the particular components described. Accordingly, additional topology configurations may be used to practice the methods and systems herein and/or components described may be excluded without departing from the methods and systems disclosed herein.

Figure 6:
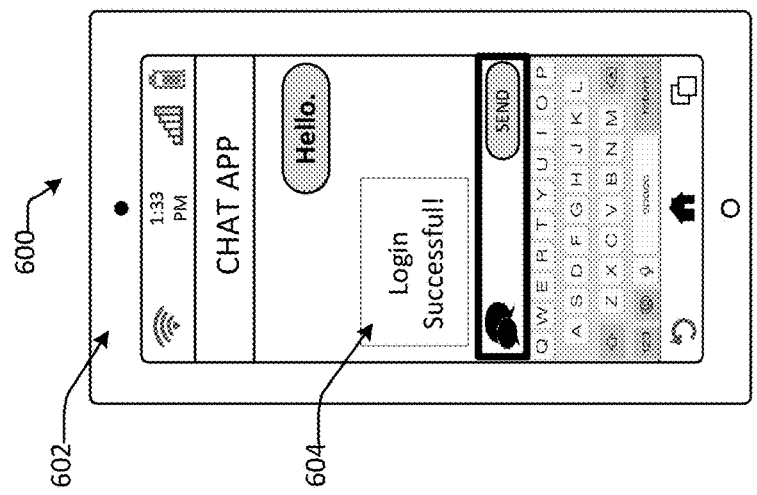
FIG. 6 illustrates a successful authentication of a bot user via a web application.

FIG. 6 illustrates a successful authentication of a bot user via a web application.

After the bot ensures that the received nonce value and the cached nonce value match, then a login successful message 604 may be displayed on mobile device 602. Additionally, the chat bot may access requested information associated with the user's account for the third-party application. Subsequently, once authenticated, the chat bot may access the user's account for the third-party application based on the access token associated with the user ID for the Chat App. However, as discussed previously, if a triggering event occurs or a certain time period elapses, for example, the access token may be invalid and/or expired. In this instance, a bot user may need to re-enter login credentials into the third-party application to retrieve a new access token, which may require re-authentication of the bot user to the third-party bot website.

As should be appreciated, the various methods, devices, components, etc., described with respect to FIG. 6 are not intended to limit systems 600 to being performed by the particular components described. Accordingly, additional topology configurations may be used to practice the methods and systems herein and/or components described may be excluded without departing from the methods and systems disclosed herein.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, as described herein.

Figure 7:
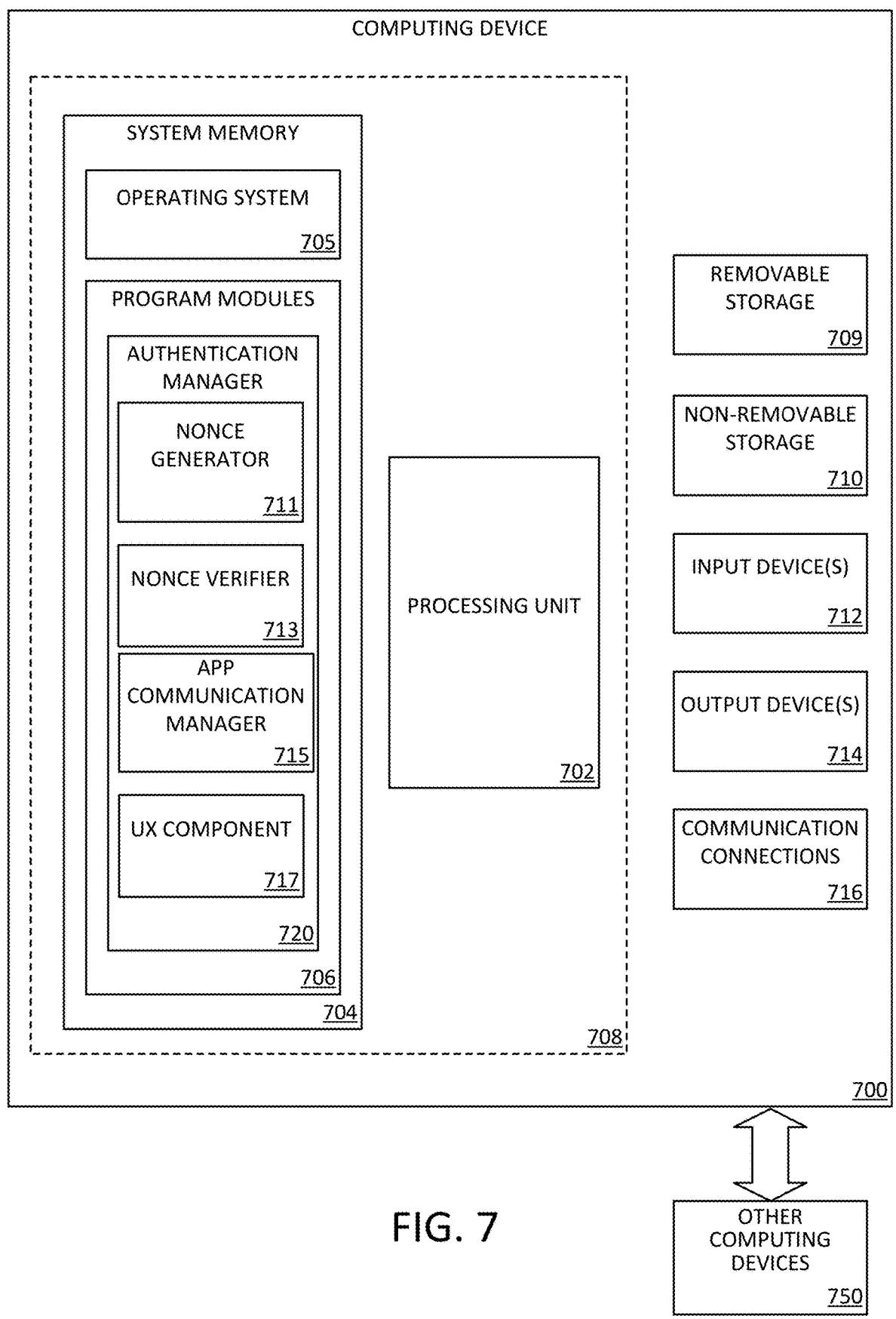
FIG. 7 is a block diagram illustrating example physical components of a computing device with which aspects of the disclosure may be practiced.

FIG. 7 is a block diagram illustrating example physical components (e.g., hardware) of a computing device 700 with which aspects of the disclosure may be practiced. The computing device components described below may have computer-executable instructions for implementing an authentication manager 720 on a computing device (e.g., server computing device and/or client computing device). The computer-executable instructions for an authentication manager 720 can be executed to implement the methods disclosed herein, including a method of automatically authenticating a bot user via a web application. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running an authentication manager 720, and, in particular, an nonce generator 711, a nonce verifier 713, an application communication manager 715, and/or UX Component 717.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., authentication manager 720) may perform processes including, but not limited to, the aspects, as described herein. Other program modules that may be used in accordance with aspects of the present disclosure, and in particular for automatically authenticating a bot user via a web application, may include nonce generator 711, nonce verifier 713, application communication manager 715, and/or UX Component 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include tangible storage media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such tangible computer storage media may be part of the computing device 700. Computer storage media may be non-transitory media that does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
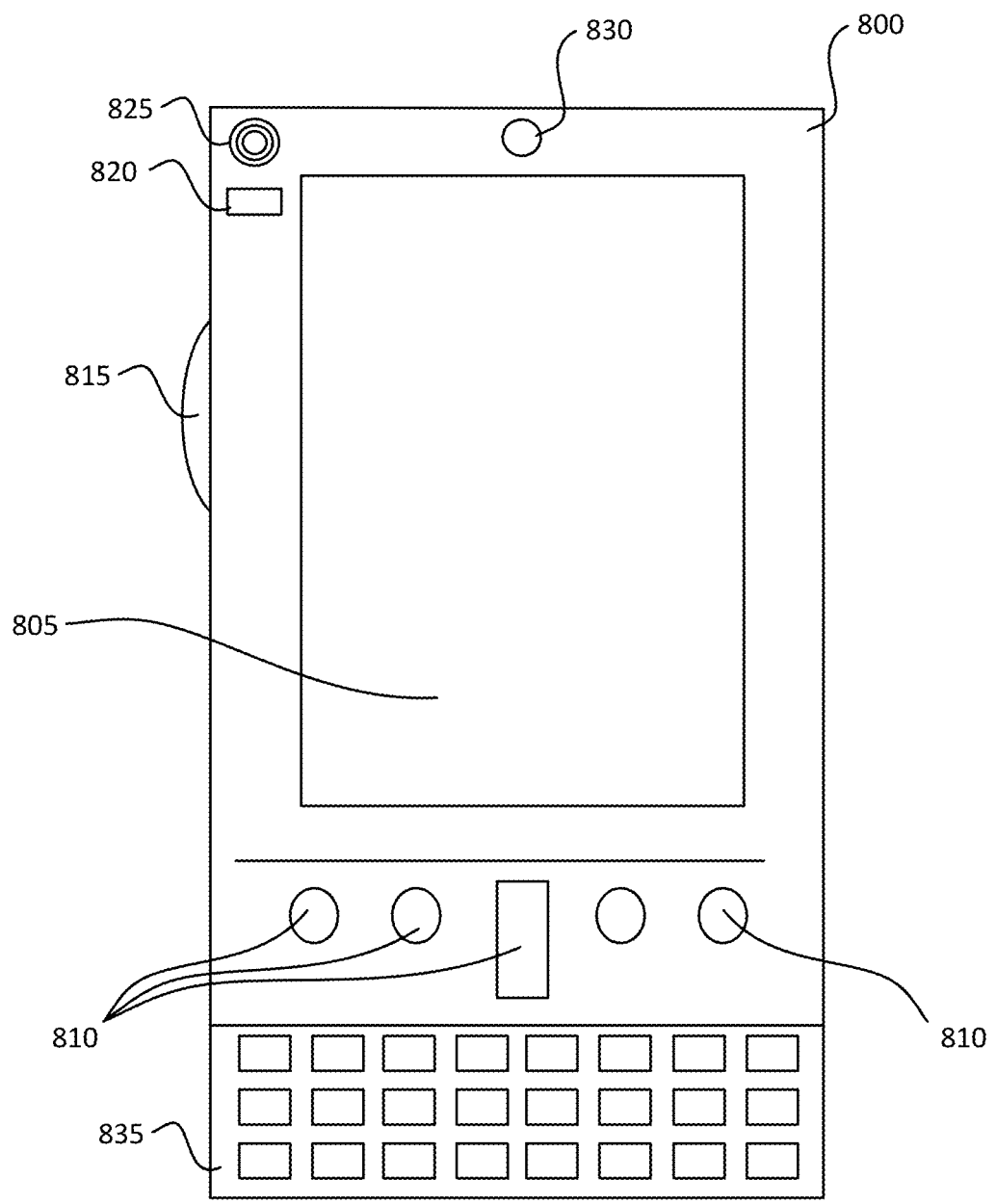
FIGS. 8A and 8B are simplified block diagrams of a mobile computing device with which aspects of the present disclosure may be practiced.
Figure 8B:
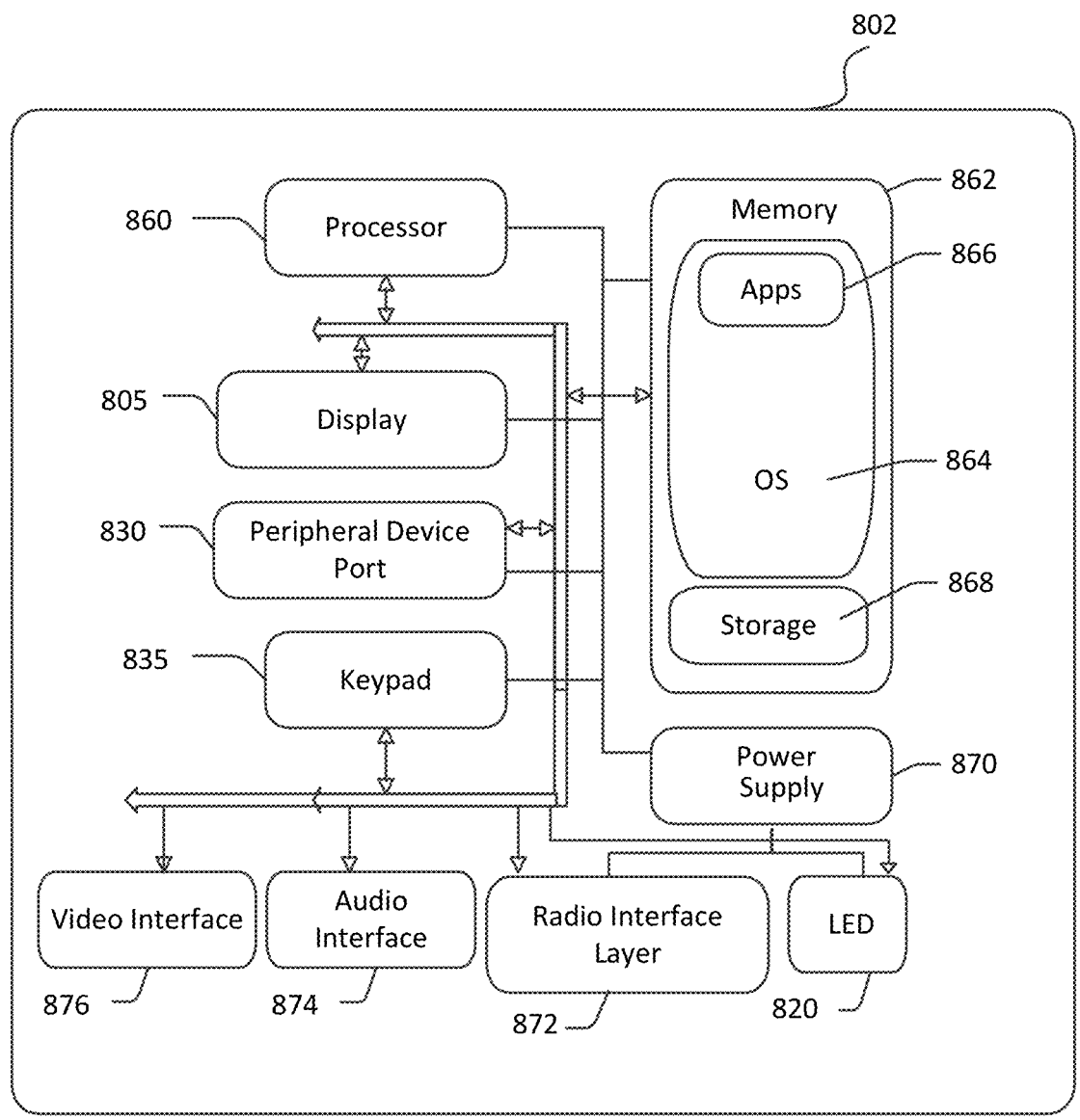

FIGS. 8A and 8B illustrate a mobile computing device 800, for example, a mobile telephone, a smart phone, wearable computer (such as a smart watch or head-mounted display for virtual reality applications), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for automatically authenticating a bot user via a web application (e.g., nonce generator 211, nonce verifier 213, application communication manager 215, and/or UX Component 217, etc.).

The system 802 has a power supply 870, which may be implemented as one or more batteries. The power supply 870 may further include an external power source, such as an AC adapter or a powered docking cradle that supplements or recharges the batteries. The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and are not intended to limit the disclosure to a particular sequence of steps or a particular combination of hardware or software components.

Figure 9:
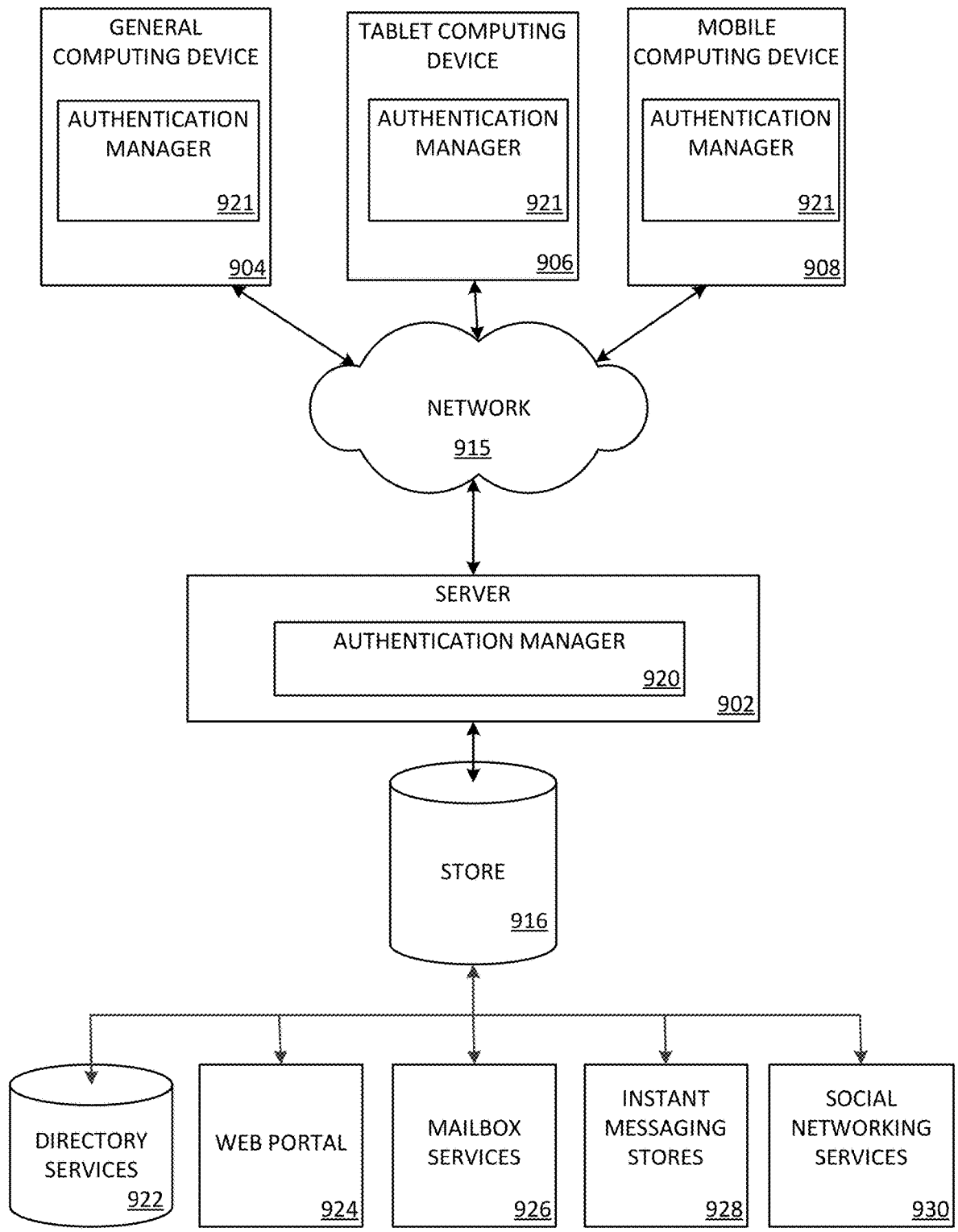
FIG. 9 is a simplified block diagram of a distributed computing system in which aspects of the present disclosure may be practiced.

FIG. 9 illustrates one aspect of the architecture of a system for processing data received at a computing system from a remote source, such as a general computing device 904 (e.g., personal computer), tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking service 930. The authentication manager 921 may be employed by a client that communicates with server device 902, and/or the authentication manager 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above with respect to FIGS. 1-9 may be embodied in a general computing device 904 (e.g., personal computer), a tablet computing device 906 and/or a mobile computing device 908 (e.g., a smart phone). Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
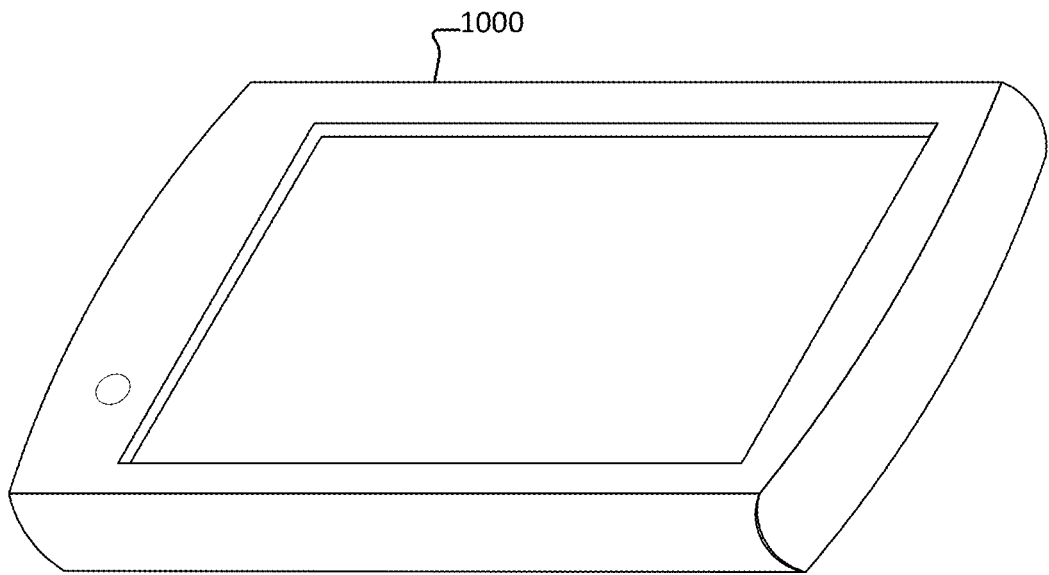
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components.

In aspects, a processor-implemented method of authenticating a user of a web application in provided. The method includes receiving, by a first application hosting a web application, a request to access a second application, where the second application is remote from the first application. When access to the second application is not authorized for the web application, the method includes opening a window within the first application that provides a link to the second application, where the link is operable to receive user access credentials for the second application. The method further includes receiving, by the first application, a nonce from a web service associated with the web application and sending, by the first application, the nonce to the web application via an invisible message. Based on a match between the sent nonce and a stored nonce of a collection of stored nonces, the method also includes receiving authentication of the user of the web application and opening a window within the first application for accessing the second application via the web application.

In further aspects, a system for authenticating a user of a web application is provided. The system includes at least one processing unit and at least one memory storing computer-executable instructions that when executed by the at least one processing unit cause the system to perform a method. The method includes receiving, by a first application hosting a web application, a request to access a second application, where the second application is remote from the first application. When access to the second application is not authorized for the web application, the method further includes opening a window within the first application that provides a link to the second application, where the link is operable to receive user access credentials for the second application. Additionally, the method includes receiving, by the first application, a nonce from a web service associated with the web application and sending, by the first application, the nonce to the web application via an invisible message. The method also includes receiving a confirmation that the sent nonce matches a cached nonce and, based on the confirmation, opening a window within the first application for accessing the second application via the web application.

In still further aspects, a computer storage medium is provided. The computer storage medium includes computer-executable instructions that when executed by a processing unit perform a method of authenticating a user of a web application. The method further includes receiving, by a first application hosting a web application, a request to access a second application, where the second application is remote from the first application. When access to the second application is not authorized for the web application, the method further includes opening a window within the first application that provides a link to the second application, where the link is operable to receive user access credentials for the second application. Additionally, the method includes receiving, by the first application, a nonce from a web service associated with the web application and sending, by the first application, the nonce to the web application via an invisible message. Based on a match between the sent nonce and a stored nonce of a collection of stored nonces, the method includes receiving authentication of the user of the web application and opening a window within the first application for accessing the second application via the web application.

The embodiments of the disclosure described herein are implemented as logical steps in one or more computer systems. The logical operations of the present disclosure are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosure. Accordingly, the logical operations making up the embodiments of the disclosure described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the disclosure. Since many embodiments of the disclosure can be made without departing from the spirit and scope of the disclosure, the disclosure resides in the claims hereinafter appended. Furthermore, structural features of the different embodiments may be combined in yet another embodiment without departing from the recited claims.

What is claimed is:

1. A processor-implemented method of authenticating a user of an application, comprising:
    transmitting, by a first client application, a user identifier to a first web application;
    receiving, by the first client application, a request to access a second web application that uses different access credentials than the first web application;
    receiving, by the first client application, a second identifier from a web service, the second identifier identifying authenticated access to the second web application based on access credentials provided by a second client application;
    sending, by the first client application, the second identifier to the first web application, the first web application configured to associate the user identifier with the second identifier and the authenticated access to the second web application;
    receiving, by the first client application, an indication from the first web application that the user identifier is authenticated for accessing the second web application; and
    accessing, by the first client application, the second web application, via the first web application in response to the received indication.

2. The processor-implemented method of claim 1, further comprising:
    retrieving an access token for the second web application from the web service.

3. The processor-implemented method of claim 2, wherein the access token for the second web application is associated with the user identifier for the first client application.

4. The processor-implemented method of claim 3, further comprising:
    receiving a second request to access the second web application; and
    based on the access token for the second web application associated with the user identifier for the first client application, opening a window within the first client application for accessing the second web application via the first web application.

5. The processor-implemented method of claim 1, wherein the first web application is a chat bot, and wherein the first client application is a chat application.

6. The processor-implemented method of claim 1, wherein the first web application is a bot, and wherein the first client application is a messaging application.

7. The processor-implemented method of claim 1, wherein the second web application is a social-networking application.

8. A system for authenticating a user of an application, comprising:
    at least one hardware processing unit; and
    at least one memory storing computer-executable instructions that when executed by the at least one processing unit cause the system to:
    transmit, by a first client application, a user identifier to a first web application;
    receive, by the first client application, a request to access a second web application that uses different access credentials than the first web application;
    receiving across a trust boundary with the first client application, access credentials for the second web application;
    receive, by the first client application, a second identifier from a web service, the second identifier identifying authenticated access to the second web application based on access credentials provided by a second client application;
    send, by the first client application, the second identifier to the first web application, the first web application configured to associate the user identifier with the second identifier and the authenticated access to the second web application;
    receive, by the first client application, a confirmation that the sent second identifier matches a cached identifier;
    based on the confirmation, access, by the first client application, the second web application via the first web application and the user identifier.

9. The system of claim 8, wherein the first web application is authorized to access the second web application based on the access token.

10. The system of claim 8, further comprising:
    in response to receiving the confirmation that the second identifier matches the cached identifier, recognizing the user of the first web application as authenticated.

11. The system of claim 8, wherein the first web application is a chat bot, and wherein the first client application is a chat application.

12. The system of claim 8, wherein the first web application is a bot, and wherein the first client application is a messaging application.

13. The system of claim 8, wherein the second web application is a social-networking application.

14. A computer storage medium comprising computer-executable instructions that when executed by a processing unit perform a method of authenticating a user of an application, the method comprising:
   transmitting, by a first client application, a user identifier to a first web application;
   receiving, by the first client application, a request to access a second web application that uses different access credentials than the first web application;
   receiving, by the first client application, a second identifier from a web service the second identifier identifying authenticated access to the second web application based on the access credentials provided by the second client application;
   sending, by the first client application, the second identifier to the first web application, the first web application configured to associate the user identifier with the second identifier and the authenticated access to the second web application;
   receiving, by the first client application, an indication that the user identifier is authenticated for accessing the second web application; and
   accessing, by the first client application, the second web application via the first web application and user identifier in response to the received indication.

15. The computer storage medium of claim 14, further comprising:
   retrieving an access token for the second web application from the web service; and
   wherein the accessing of the second web application is further based on the access token.

16. The computer storage medium of claim 15, wherein the access token for the second web application is associated with the user identifier for the first client application.

17. The computer storage medium of claim 16, further comprising:
   receiving, by the first client application, a second request to access the second web application;
   retrieving the access token for the second web application from the user identifier for the first client application; and
   opening, by the first client application, a for accessing the second web application via the access token.

18. The computer storage medium of claim 14, wherein the first web application is a chat bot, and wherein the first client application is a chat application.

19. The computer storage medium of claim 14, wherein the first web application is a bot, and wherein the first client application is a messaging application.

20. The computer storage medium of claim 14, wherein the second web application is a social-networking application.

* * * * *